(No Model.)

G. VAUGHAN.
DUMP WAGON.

No. 556,596. Patented Mar. 17, 1896.

WITNESSES:
Edward Thorpe
Fred Acker

INVENTOR
G. Vaughan
BY Munn & Co
ATTORNEYS.

UNITED STATES PATENT OFFICE.

GEORGE VAUGHAN, OF SALT LAKE CITY, UTAH.

DUMP-WAGON.

SPECIFICATION forming part of Letters Patent No. 556,596, dated March 17, 1896.

Application filed May 7, 1895. Serial No. 548,408. (No model.)

*To all whom it may concern:*

Be it known that I, GEORGE VAUGHAN, of Salt Lake City, in the county of Salt Lake and Territory of Utah, have invented a new and Improved Dump-Wagon, of which the following is a full, clear, and exact description.

My invention relates to an improvement in dump-wagons, and it has for its object to construct a wagon in such manner that the driver, without leaving his seat, may drop the bottom of the wagon to spill its contents in a manner either to dump the entire load in a pile or distribute the load over a predetermined area, and a further object of the invention is to provide a simple and conveniently-manipulated device for regulating the dumping gates or doors of the wagon.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in both figures.

Figure 1:
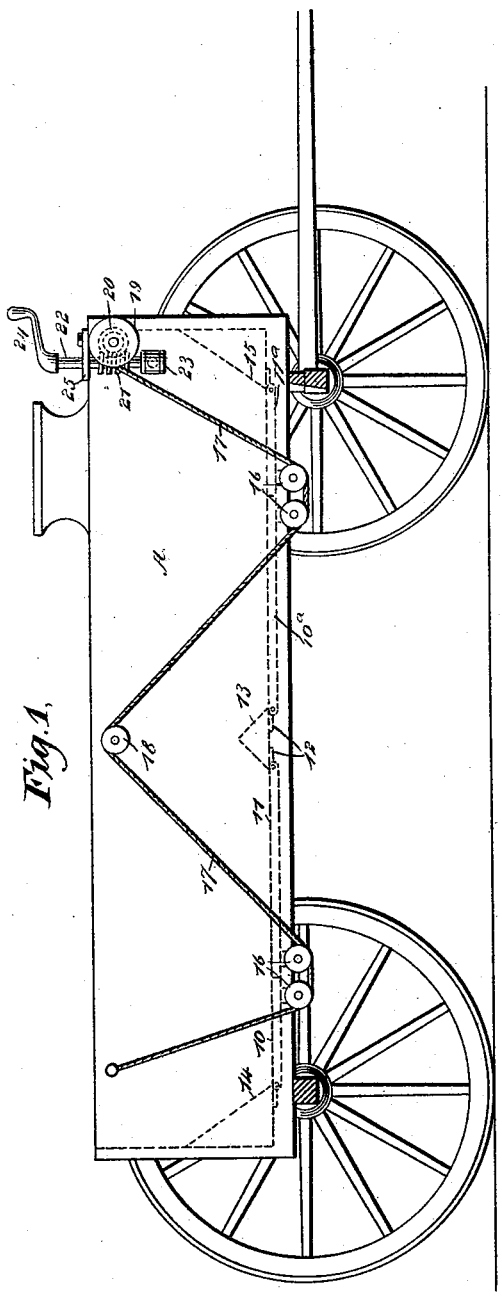
Figure 2:
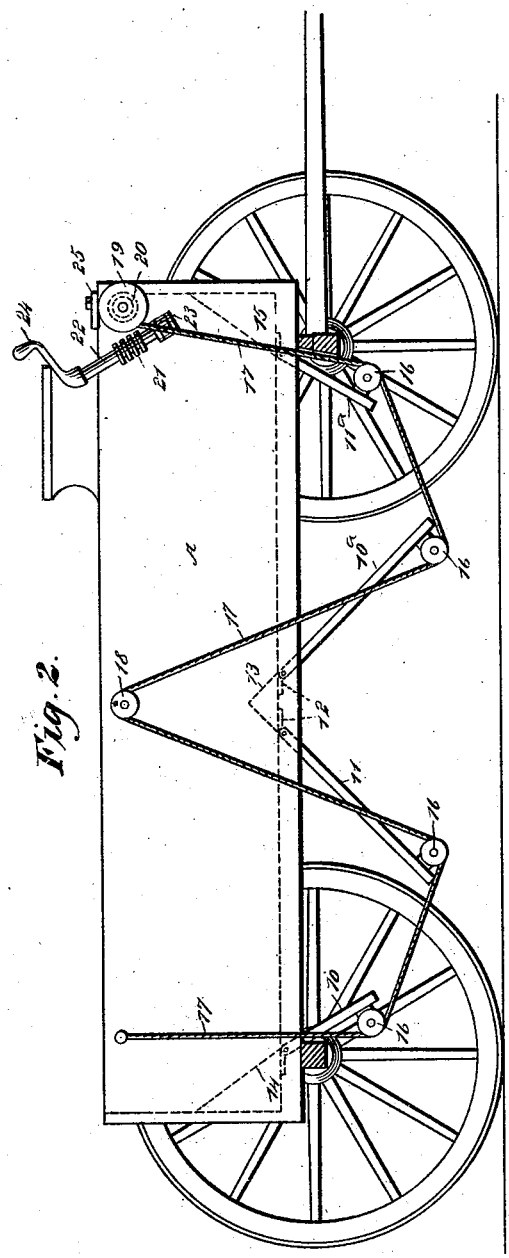

Figure 1 is a side elevation of the body of the wagon having the improvement applied, the axles of the vehicle being in transverse section and the bottom of the body being represented as closed; and Fig. 2 is a view similar to Fig. 1, with the exception that the gates or doors of the body are illustrated as open or in their dumping position.

In carrying out the invention the body A of the wagon is mounted upon the wheels in the ordinary way, and the bottom of the body is composed of a number of drop-doors, the said doors being designated, respectively, the rear door and one of the intermediate ones as 10 and $10^a$, the rear intermediate door and the forward one being designated, respectively, as 11 and $11^a$, there being ordinarily four doors in all. The doors 10 and $11^a$ are shorter than the doors 11 and $10^a$, since the door 10 is located near the rear axle and the door $11^a$ adjacent to the front wheels. Consequently these doors cannot have much play in a direction from the body of the vehicle when the doors are in dumping position, owing to the location of the brakes and brake-operating mechanism. The doors 11 and $10^a$, however, are free to move in either direction when down to dumping position, in order to clear any obstacle that they may meet. The doors 10 and 11 are adapted when closed to completely cover the bottom of the body from a point at or near the center to the rear, and the doors $10^a$ and $11^a$ perform the same function at the forward portion of the body.

The intermediate doors, $10^a$ and 11, are hinged to cross-bar 12 at the central portion of the bottom of said body, and their hinges are protected from the contents of the body of the vehicle through the medium of a housing 13. The door 10 is hinged to a cross-bar near the rear end of the vehicle, and the hinges are protected by a housing 14, extending upward and rearward to the tail-board of the wagon, while the forward door, $11^a$, is hinged to the forward portion of the body, and a housing 15 covers its hinges, extending from the bottom to the front board of the body. Each door at its free end is provided with a friction wheel or pulley 16, peripherally grooved, and a cable or chain 17 is secured to the upper rear portion of the body at one side, being passed over the pulleys of the rear doors, 10 and 11, thence upward over a pulley 18 at the central portion of the body, thence downward over the pulleys attached to the forward doors, $10^a$ and $11^a$, and upward to a connection with the drum 19, journaled at the forward upper portion of the body, it being understood that preferably this arrangement of the pulleys and cables is duplicated at each side of the vehicle, the drum-shaft extending from side to side. The said drum-shaft, for example, near its right-hand end, is provided with a worm-wheel 20, adapted to be engaged by a worm 21, located upon a shaft 22, journaled at its lower end in a pivoted bearing 23, and having a crank-arm 24 at its upper end, and a latch 25 is provided, adapted when the shaft is carried to a vertical position (in which event the worm-wheel and worm will mesh) to hold the shaft in the position shown in Fig. 1.

The pulleys 16 are preferably placed on cross-beams extending along the bottom of the wagon-body from side to side.

In operation the dumping or drop doors, being in the closed position shown in Fig. 1, are held in such position by the shaft 22 being in controlling engagement with the drum-shaft and held in such engagement. When the wagon approaches the dumping-ground, if the material carried is to be dumped in one pile the hand-shaft 22 is disconnected from its latch 25 and thrown entirely out of engagement with the drum-shaft, as shown in Fig. 2, whereby the weight of the material will force the doors down and the dumping of the load will be effected; but if the material is to be scattered while being dumped the hand-shaft is manipulated to open the doors partially at first to a predetermined extent and gradually increasing the opening until the entire load has been emptied. To bring the doors to the upper position again, the movement of the hand-shaft 22 is reversed after being brought in engagement with the drum-shaft, and the cable 17 will be wound upon the drums and the doors gradually drawn up to their closed position. The improvement interferes in no way with the carrying capacity of the wagon-body, and enables the driver to control the dumping operation without leaving his seat. The character of the housings 13, 14 and 15 may be varied as occasion may demand.

Having thus described my invention, I claim as new and desire to secure by Letters Patent—

1. A dumping-wagon having a mounted body portion, two rigid housings respectively located at the inner ends of the body portion, said housings being inclined inwardly and downwardly, a third and rigid housing centrally located in the body portion and having a double inclined upper side, the third housing being extended transversely, two gates respectively hinged to the lower edges of the inclined sides of the third housing and suspended thereby, two additional gates respectively hinged to the first or end housings and supported thereby, and means for operating the gates, substantially as described.

2. A dumping-wagon, having a body portion, two housings respectively located at the inner ends of the body portion, said housings being inclined inwardly and downwardly, a third housing centrally located in the body portion and having a double inclined upper side, two gates respectively hinged to the lower edges of the inclined sides of the third housing, two additional gates respectively hinged to the first or end housings, the additional gates being shorter than the first gates, pulleys revolubly mounted on the gates, a rope passing over the pulleys and having one end fixed to the body portion, a pulley carried by the body portion and over which the rope passes, a drum mounted on the body portion and connected with the rope, and a swinging worm-shaft capable of movement toward and from the drum and of meshing therewith, substantially as described.

3. A dumping-wagon having a mounted body portion, two pairs of swinging gates forming the bottom thereof, said gates being mounted on transverse axes, a roller mounted on each gate, a roller fixed to the body portion and between the pairs of gates, a rope extending longitudinal with the wagon and having one end fixed to the wagon-body, the rope being passed over the pulleys, and means for drawing on the remaining end of the rope, substantially as described.

GEORGE VAUGHAN.

Witnesses:
SAMUEL W. HUTCHINGS,
OWEN MYERS.